US011163958B2

(12) United States Patent
Petri et al.

(10) Patent No.: US 11,163,958 B2
(45) Date of Patent: Nov. 2, 2021

(54) DETECTING AND HIGHLIGHTING INSIGHTFUL COMMENTS IN A THREAD OF CONTENT

(71) Applicant: International Business Machines Corporation, Armonk, NY (US)

(72) Inventors: John E. Petri, St. Charles, MN (US); Adam T. Clark, Mantorville, MN (US); Aspen L. Payton, Byron, MN (US); Jeffrey K. Huebert, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 16/141,705

(22) Filed: Sep. 25, 2018

(65) Prior Publication Data
US 2020/0097546 A1 Mar. 26, 2020

(51) Int. Cl.
*G06F 40/30* (2020.01)

(52) U.S. Cl.
CPC .................... *G06F 40/30* (2020.01)

(58) Field of Classification Search
CPC combination set(s) only.
See application file for complete search history.

(56) References Cited

U.S. PATENT DOCUMENTS

| 9,268,770 | B1* | 2/2016 | Kursun | G06F 40/30 |
| 9,361,604 | B2 | 6/2016 | Dhara et al. | |
| 9,400,779 | B2* | 7/2016 | Convertino | G06F 40/289 |
| 9,542,458 | B2 | 1/2017 | Song et al. | |
| 9,659,084 | B1* | 5/2017 | Zhang | G06F 16/338 |
| 9,753,913 | B1* | 9/2017 | Kursun | G06F 16/285 |
| 9,996,623 | B1* | 6/2018 | Ferrill | G06F 16/90335 |
| 2002/0010614 | A1* | 1/2002 | Arrowood | G06Q 10/10 705/7.37 |
| 2008/0222531 | A1 | 9/2008 | Davidson et al. | |
| 2008/0270518 | A1* | 10/2008 | McGowan | G06Q 10/107 709/202 |
| 2010/0042910 | A1* | 2/2010 | Manolescu | G06F 16/9535 715/202 |

(Continued)

FOREIGN PATENT DOCUMENTS

WO  WO2013166076 A1  11/2013

OTHER PUBLICATIONS

Backstrom et al., "Characterizing and Curating Conversation Threads: Expansion, Focus, Volume, Re-entry", WSDM'13, Feb. 4-8, 2013, Rome, Italy, Copyright 2013 ACM, Total 10 pp.

ip.com, "Test Case Generation Driven by Generated Metadata from Semantic Analysis of Language/Technology Documentation", IPCOM000241622D, May 18, 2015, can be retrieved from the Internet at <URL: http://ip.com/IPCOM/000241622>, Total 5 pp.

(Continued)

*Primary Examiner* — Abdelali Serrou
(74) *Attorney, Agent, or Firm* — Konrad Raynes Davda & Victor LLP; Janaki K. Davda

(57) ABSTRACT

Provided are techniques for detecting and highlighting insightful comments in a thread of content. A context is determined for a thread of content including comments. Each of the comments in the thread of content is analyzed to determine which comments are insightful and which comments are not insightful. At least one of highlighting the comments that are insightful and hiding the comments that are not insightful are performed. Semantic relationships are used to provide supporting evidence and cross references to additional information for the comments that are related to the context.

18 Claims, 10 Drawing Sheets

(56) References Cited

U.S. PATENT DOCUMENTS

| | | | | |
|---|---|---|---|---|
| 2010/0318520 | A1* | 12/2010 | Loeb | G06F 16/4393 707/743 |
| 2012/0173243 | A1* | 7/2012 | Anand | G06F 40/40 704/270.1 |
| 2012/0265806 | A1* | 10/2012 | Blanchflower | H04L 51/32 709/204 |
| 2012/0330968 | A1* | 12/2012 | Lee | G06F 16/951 707/748 |
| 2013/0018869 | A1* | 1/2013 | Hanson | G06F 16/951 707/722 |
| 2013/0117830 | A1* | 5/2013 | Erickson | H04W 48/12 726/6 |
| 2014/0089898 | A1* | 3/2014 | Salapura | G06Q 10/063112 717/123 |
| 2014/0188997 | A1* | 7/2014 | Schneiderman | H04L 51/10 709/204 |
| 2014/0201201 | A1 | 7/2014 | Song et al. | |
| 2014/0337436 | A1* | 11/2014 | Hoagland | G06F 16/9535 709/204 |
| 2014/0344213 | A1 | 11/2014 | Kent et al. | |
| 2014/0379729 | A1* | 12/2014 | Savage | H04L 51/14 707/748 |
| 2015/0006646 | A1* | 1/2015 | Jones | H04L 51/32 709/206 |
| 2015/0058417 | A1* | 2/2015 | McConnell | H04L 67/306 709/204 |
| 2015/0256499 | A1* | 9/2015 | Kumar | H04L 67/22 709/206 |
| 2015/0261940 | A1* | 9/2015 | Roundy | G06F 21/10 726/26 |
| 2015/0294376 | A1* | 10/2015 | Christiansen | G06Q 50/01 705/14.19 |
| 2016/0012739 | A1* | 1/2016 | Jafari | G09B 5/06 434/353 |
| 2016/0180735 | A1* | 6/2016 | Clark | G06F 40/45 434/236 |
| 2016/0253719 | A1* | 9/2016 | Akpala | G06Q 30/0282 705/347 |
| 2016/0378741 | A1* | 12/2016 | Mullins | G06F 40/177 715/227 |
| 2017/0024375 | A1* | 1/2017 | Hakkani-Tur | G10L 15/1822 |
| 2017/0132371 | A1* | 5/2017 | Amarasingham | G06F 19/328 |
| 2017/0249200 | A1* | 8/2017 | Mustafi | G06F 11/076 |
| 2017/0302610 | A1* | 10/2017 | Naidu | H04L 51/16 |
| 2017/0345079 | A1* | 11/2017 | Rangan | G06Q 30/0633 |
| 2018/0293278 | A1* | 10/2018 | Kapoor | H04L 51/32 |
| 2018/0357323 | A1* | 12/2018 | Allen | G06F 16/9535 |
| 2018/0367494 | A1* | 12/2018 | Skeene | H04L 51/12 |
| 2019/0042557 | A1* | 2/2019 | Okubo | G06F 40/103 |
| 2019/0281001 | A1* | 9/2019 | Miller | G06N 20/00 |

OTHER PUBLICATIONS ip.com, "System and Method to Find Similar Discussion Threads", IPCOM000216339D, Mar. 31, 2012, can be retrieved from the Internet at <URL: http://ip.com/IPCOM/000216339>, Total 4 pp.

ip.com, "System and Method to Automatically Identify Appropriate Social Network Recipients for a Post Based on Content and Prior User Behavior", IPCOM000229415D, Jul. 28, 2013, can be retrieved from the Internet at <URL:http://ip.com/IPCOM/000229415>, Total 3 pp.

ip.com, "Instant Messaging Comment Flagging for Always-on-Top Viewing", IPCOM000214639D, Jan. 31, 2012, can be retrieved from the Internet at <URL: http://ip.com/IPCOM/000214639>, Total 3 pp.

ip.com, "A Method that Optimizes Long Posts Generated from Social Networking Sites", IPCOM000228693D, Jun. 30, 2013, can be retrieved form the Internet at <URL: http://ip.com/IPCOM/000228693>, Total 5 pp.

Mell, P. and T. Grance, "Effectively and Securely Using the Cloud Computing Paradigm", [online], Oct. 7, 2009, retrieved from the Internet at <URL: http://csrc.nist.gov/groups/SNS/cloud-computing/cloud-computing-v26.ppt>, Total 80 pp.

Mell, P. and T. Grance, "The NIST Definition of Cloud Computing (Draft)", Sep. 2011, Computer Security Division Information Technology Laboratory National Institute of Standards and Technology, Total 7 pp.

Slater et al., "High-Resolution Identification of Chromosomal Abnormalities Using Oligonucleotide Arrays Containing 116,204 SNPs", Am. J. Hum. Genet. 77:709-726, 2005, © 2005 by The American Society of Human Genetics, Received Mar. 18, 2005; accepted for publication Aug. 10, 2005; electronically published Sep. 16, 2005, Total 18 pp.

Stewart et al., "Off-Topic detection in Conversational Telephone Speech", Proceedings of the Analyzing Conversations in Text and Speech (ACTS) Workshop at HLT-NAACL 2006, pp. 8-14, New York City, New York, Jun. 2006, © 2006 Association for Computational Linguistics, Total 7 pp.

Murdock, J.W., "Decision Making in IBM Watson™ Question Answering", IBM Watson Research Center, © International Business Machines Corporation 2015, Total 19 pp.

IBM, "Welcome to Watson", © 2014 International Business Machines Corporation, Total 16 pp.

IBM, "Why Watson Assistant", [online], [Retrieved on Sep. 24, 2018]. Retrieved from the Internet at <URL: https://www.ibm.com/watson/ai-assistant/>, Total 2 pp.

Bellino, E., "IBM Watson Assistant Guided Demo: Create a Chatbot to Plan a Trip", [online], [Retrieved on Sep. 24, 2018]. Retrieved from the Internet at <URL: https://www.ibm.com/cloud/garage/demo/try-watson-assistant/>, Total 14 pp.

* cited by examiner

550

☐ Show me insightful comments in a current branch of a conversation tree
☑ Show me all insightful comments

---

I have this great thermostat... (thread context)
Insightful comments:
    I have this great self cleaning air conditioner... (thread context)
    Insightful comments:
        My neighbor's tree fell on my air conditioner last summer and broke it...
    I've saved $$ over the past 6 months using my thermostat...

FIG. 5B

DETECTING AND HIGHLIGHTING INSIGHTFUL COMMENTS IN A THREAD OF CONTENT

FIELD

Embodiments of the invention relate to detecting and highlighting insightful comments in a thread of content (e.g., a conversation or comments).

BACKGROUND

The World Wide Web (WWW or "web") contains massive amounts of user generated content, including information source and comments on those information sources. To date, it has been very difficult to automatically glean insights from user generated content due to the sheer volume and diversity of information, as well as, the informal and imprecise language that is often used. Compounding this issue is the fact that user generated content is no longer considered less important than other content on the web. Users are relying on user generated content more than ever to discover new insights and to help them make important decisions. However, a user may pore through comment after comment of regurgitated viewpoints in order to find insightful comments.

SUMMARY

In accordance with embodiments, a computer-implemented method is provided for detecting and highlighting insightful comments in a thread of content. A context is determined for a thread of content including comments. Each of the comments in the thread of content is analyzed to determine which comments are insightful and which comments are not insightful. At least one of highlighting the comments that are insightful and hiding the comments that are not insightful are performed. Semantic relationships are used to provide supporting evidence and cross references to additional information for the comments that are related to the context.

In accordance with other embodiments, a computer program product is provided for detecting and highlighting insightful comments in a thread of content. The computer program product comprising a computer readable storage medium having program code embodied therewith, the program code executable by at least one processor to perform operations. A context is determined for a thread of content including comments. Each of the comments in the thread of content is analyzed to determine which comments are insightful and which comments are not insightful. At least one of highlighting the comments that are insightful and hiding the comments that are not insightful are performed. Semantic relationships are used to provide supporting evidence and cross references to additional information for the comments that are related to the context.

In yet other embodiments, a computer system is provided for detecting and highlighting insightful comments in a thread of content. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A context is determined for a thread of content including comments. Each of the comments in the thread of content is analyzed to determine which comments are insightful and which comments are not insightful. At least one of highlighting the comments that are insightful and hiding the comments that are not insightful are performed. Semantic relationships are used to provide supporting evidence and cross references to additional information for the comments that are related to the context.

BRIEF DESCRIPTION OF THE SEVERAL VIEWS OF THE DRAWINGS

Referring now to the drawings in which like reference numbers represent corresponding parts throughout:

FIGS. 5A and 5B illustrate an alternative representation of related insightful comments in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
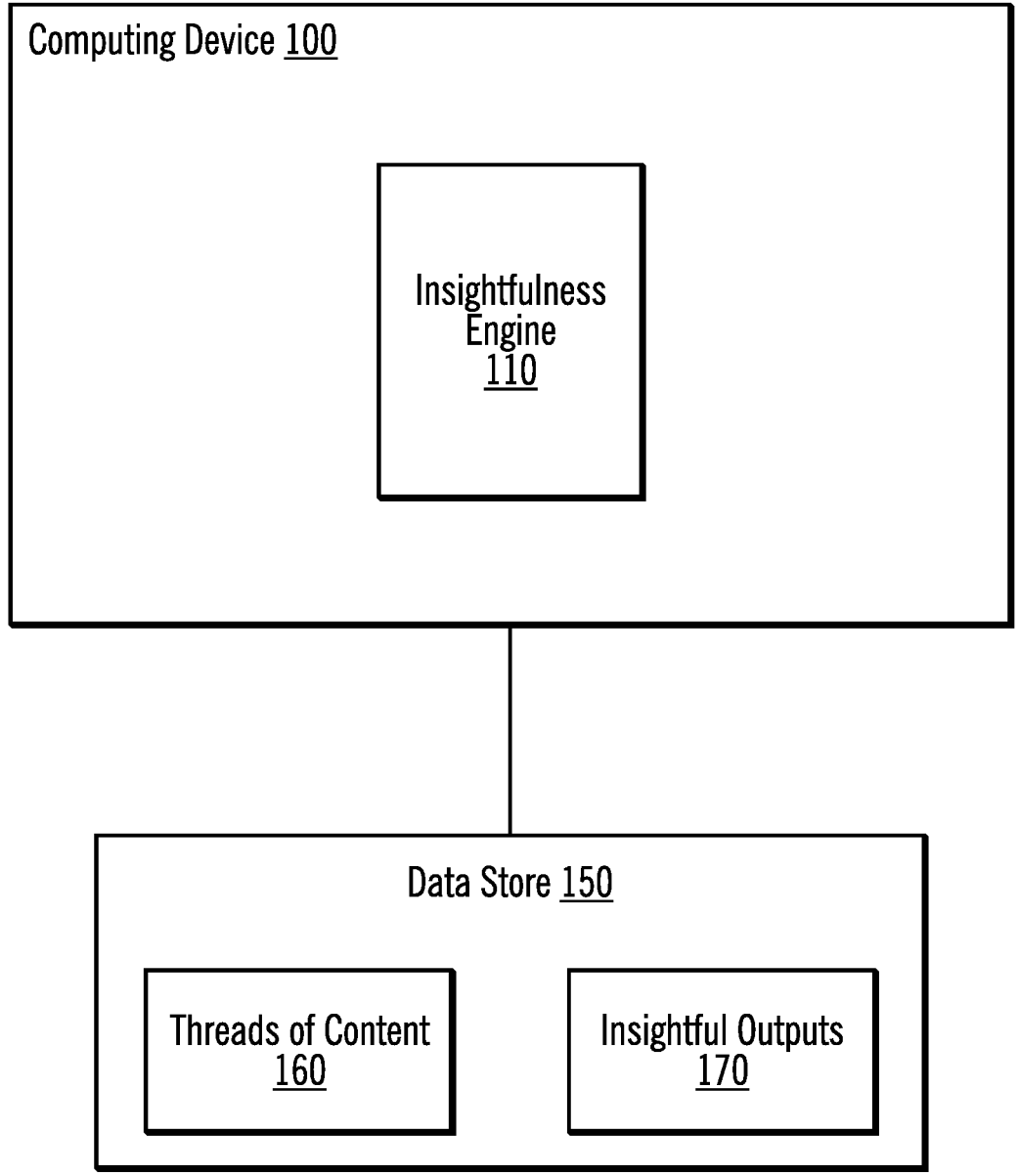
FIG. 1 illustrates, in a block diagram, a computing environment in accordance with certain embodiments.

FIG. 1 illustrates, in a block diagram, a computing environment in accordance with certain embodiments. The computing device 100 of FIG. 1 includes an insightfulness engine 110. The computing device 100 is coupled to a data store 150. The data store 150 stores threads of content 160 (e.g., tweets, posts, blogs, videos, comments, forums, etc.) and insightful outputs 170 (e.g., insightful comments, a conversation tree of the insightful comments, supporting evidence for the insightful comments, etc.). A thread of content may be described as a series of comments (e.g., tweets, social media comments, blog comments, web page comments, forum comments, etc.) by multiple users participating in the thread of content. The thread of content is associated with an information source (e.g., an article, blog, web page, or other post) for which comments are being submitted. In certain embodiments, the insightful outputs 170 are particularly insightful comments selected from the insightful comments based on various factors.

The insightfulness engine 110 goes beyond traditional insight analytics to discover more depth and perspective in user generated content. Additional depth and perspective may be the insights of a conversation and lead its participants in new, interesting or overlooked directions. Therefore, the insightfulness engine 110 enables detecting and highlighting insightful content among a vast amount of redundant, less important (e.g., useless) or misleading information. In certain embodiments, the insightful ness engine 110, either in addition to or instead of highlighting, hides content that is not insightful.

The insightfulness engine 110 provides a natural language technique for analyzing conversations for additional depth and perspective to provide insights. The insightfulness engine 110 normalizes content to alleviate bias and, therefore, highlight otherwise obscured insights.

With embodiments, the insightfulness engine 110 may be used to process existing content and/or to filter incoming content.

As an example, while a user is scrolling through a thread of content (e.g., comments at the bottom of a news article) and reading the content, the user may be looking for comments that relate to a personal view, offer an antagonistic view or shed new light on the conversation. The user may not be interested in regurgitated views or ideas. The insightfulness engine 110 displays insightful comments more prominently to grab the user's attention and displays supporting evidence to prove the significance of those more prominently displayed comments.

Moreover, the insightfulness engine 110 summarizes insightful comments in order to minimize reader bias due to such things as poor grammar, profanity or different lingo. If a second user attempts to add a comment containing ideas that are redundant, the insightfulness engine 110 provides a notification that the comment is redundant and suggestions for that user to improve the post before submitting.

Figure 2:
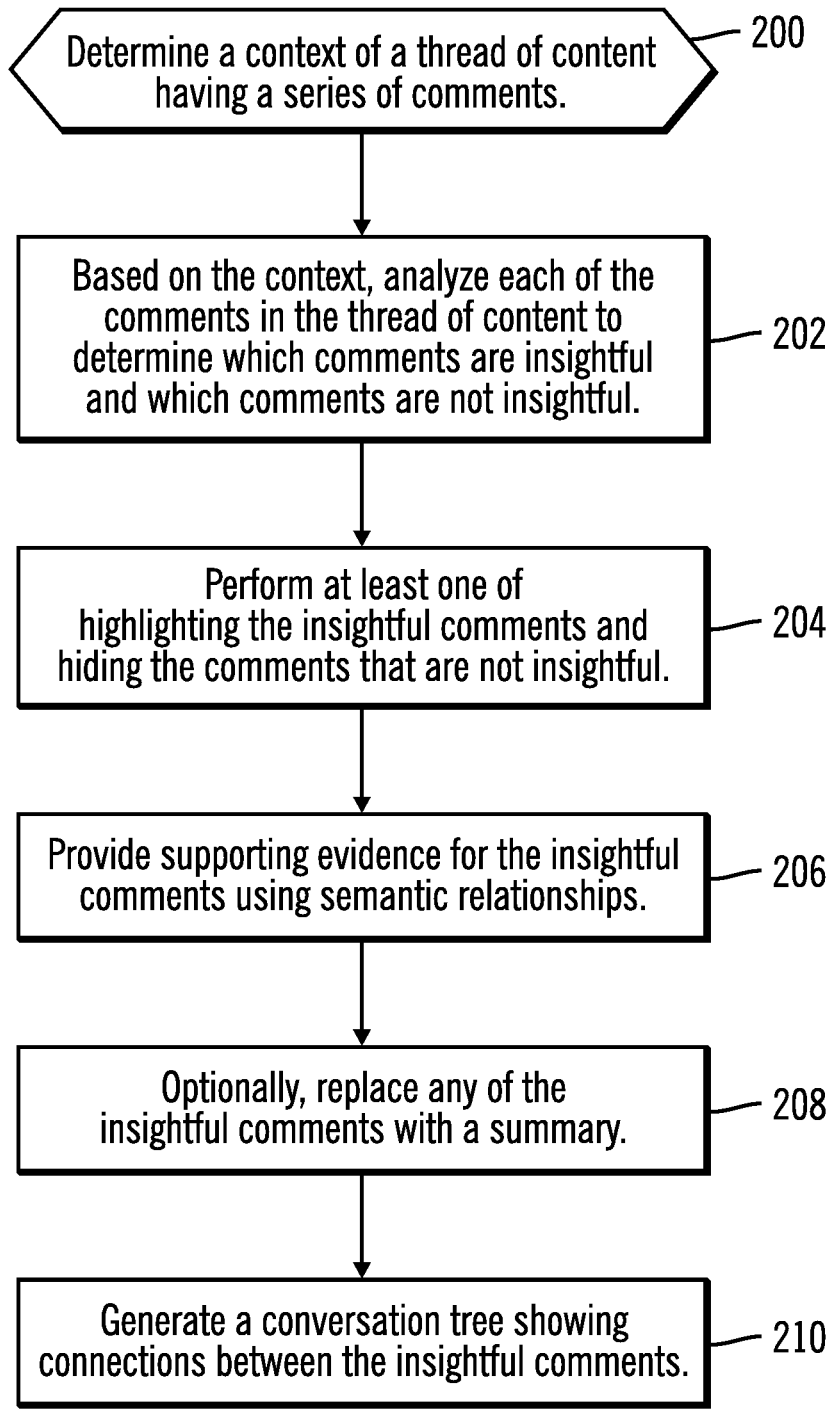
FIG. 2 illustrates, in a flow chart, operations for detecting and highlighting insightful comments in a thread of content in accordance with certain embodiments.

FIG. 2 illustrates, in a flow chart, operations for detecting and highlighting insightful comments in a thread of content in accordance with certain embodiments. Control begins at block 200 with the insightfulness engine 110 determining a context of a thread of content having a series of comments. The context may be described as a core idea or topic of the context of the thread. In certain embodiments, the insightfulness engine 110 derives the context from the information source (e.g. a web page, a video, an original tweet, a post, etc.). In certain embodiments, the insightfulness engine 110 derives the context from the first comment in the thread of content or a subsequent comment in the thread of content. The context provides a starting point for identifying deeper insights.

In block 202, the insightfulness engine 110, based on the context, analyzes each of the comments in the thread of content to determine which comments are insightful (e.g., related to the context) and which comments are not insightful (e.g., not related to the context or redundant). In certain embodiments, this is done based on Natural Language Processing (NLP). For example, based on the context, the insightfulness engine 110 inspects a length of the comment and semantics of the comment. For example, a short comment (e.g., "cool") may be determined to be not insightful, while a longer comment may be further analyzed for insightfulness. Also, for semantics, the insightfulness engine 110 reviews semantic relationships in the comment to see whether there is a deeper insight or a different perspective from the context. If the semantic relationships are generally about the same context, but sufficiently dissimilar from that context, then the insightfulness engine 110 tags the comment as insightful.

In various embodiments, there are a number of different metrics that the insightfulness engine 110 uses to determine the thresholds for tagging the comment as insightful. For example, the insightfulness engine 110 may leverage a machine learned model. With embodiments, the insightfulness engine 110 determines insight and sentiment, for example, using similarity or on-topic analysis. The insightfulness engine 110 leverages the determination of insight and sentiment to ensure a minimum level of insight before delving deeper into the semantic relationships. The insightfulness engine 110 subsequently determines a higher degree of insight or discovers new perspectives from the context. This higher degree of insight goes beyond existing similarity or on-topic metrics. For example, at least one +1 distance relationship from an original concept may constitute deeper insight. After at least one +1 distant relationship is identified, one or more +2 distance relationships may increase the confidence in the deeper insight. Any further relationship distances (+3 or more) may actually decrease the confidence in the deeper insight. These are example metrics that may be learned and implemented by a machine learned model.

In block 204, the insightfulness engine 110 performs at least one of highlighting the insightful comments and hiding the comments that are not insightful. For example, the insightful comments may be shown in a different color than other comments, may be shown in bold or larger lettering, may be shown in a different font, may be shown within a circle or square, etc.

In block 206, the insightfulness engine 110 provides supporting evidence for the insightful comments using semantic relationships. In certain embodiments, the semantic relationships are used to provide supporting evidence and cross-references to the reader.

In block 208, the insightfulness engine 110, optionally, replaces any of the insightful comments with a summary. In certain embodiments, if the insightfulness engine 110 determines that a particular insightful comment may present reader bias, then the insightfulness engine may alter the highlighting of the insightful comment and provide a summary of the insight with a link to the original ("raw" or unchanged) comment.

In block 210, the insightfulness engine 110 generates a conversation tree showing connections between the insightful comments.

Figure 3:
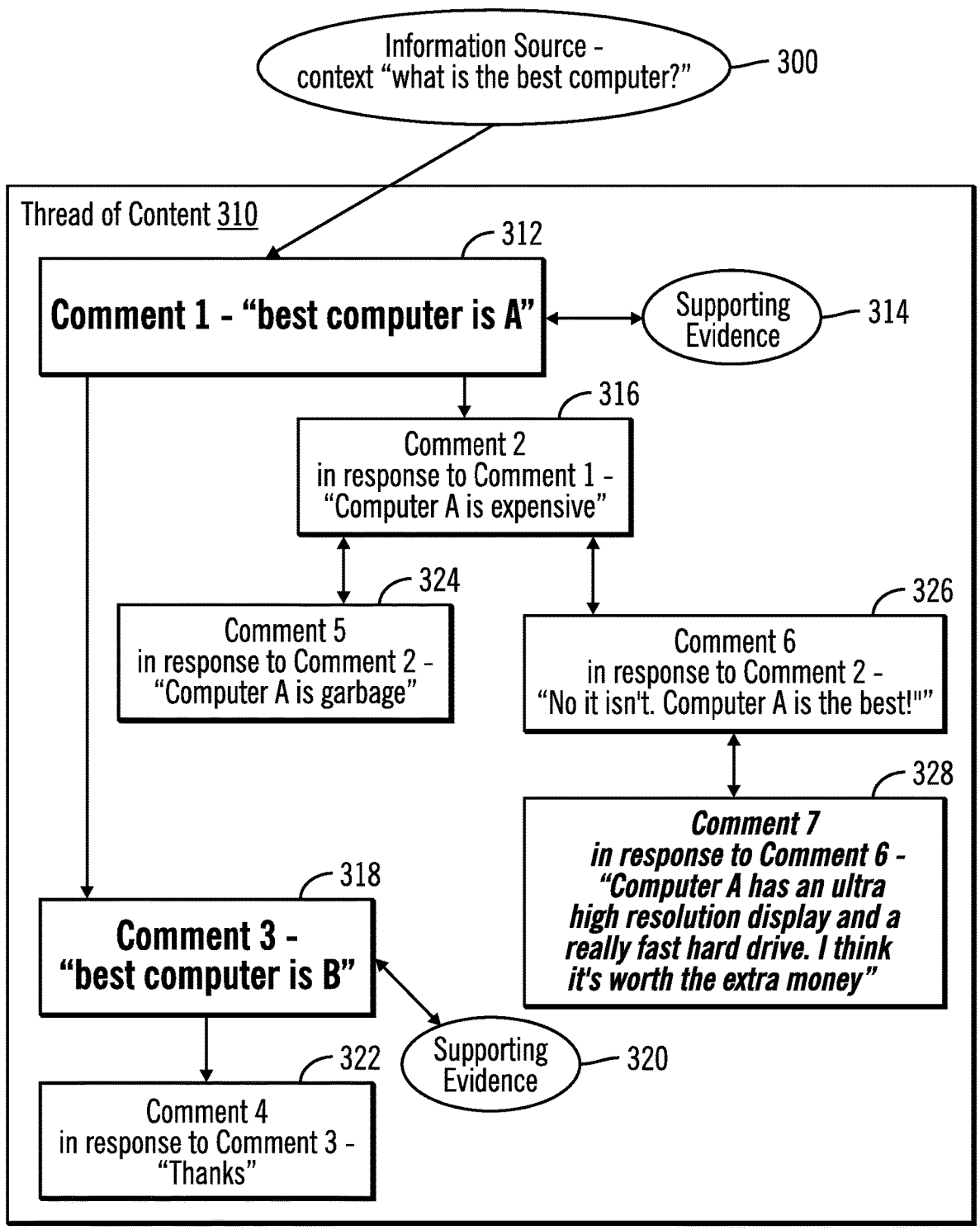
FIG. 3 illustrates, in a block diagram, an example of an information source and a thread of content in accordance with certain embodiments.

FIG. 3 illustrates, in a block diagram, an example of an information source 300 and a thread of content 310 in accordance with certain embodiments. The information source 300 has a context of "what is the best computer?". That is, the information source 300 is a post asking what the best computer is (e.g., for purchase). There is a thread of content 310 for the information source 300. Comment 1 312 indicates that "computer A is the best computer", while Comment 3 318 indicates that "computer B is the best computer". The insightfulness engine 110 determines that Comment 1 312 and Comment 3 318 are insightful as they provide suggestions of best computers, and these are highlighted by bolding and increasing the size of the text of the comments and supporting evidence 314, 320 is provided for these comments.

Also, the insightfulness engine 110 finds that Comment 2 316 (which is in response to Comment 1) is not as insightful as Comment 1 312 and Comment 3 318, but still insightful, so Comment 2 316 is illustrated in a box with dashed (rather than solid) lines. The insightfulness engine 110 finds that Comment 5 324 and Comment 6 326 (which are in response to Comment 2 316) are not insightful. However, the insightfulness engine 110 finds that Comment 7 328 (which is in response to Comment 6) is insightful as it provides additional insight for the context of the thread of comments. The insightfulness engine 110 finds that Comment 7 328, because it contains concrete feedback in the context of the thread, is more insightful than the other comments in this thread. Therefore, the insightfulness engine 110 highlights Comment 7 with bold italics.

The insightfulness engine 110 determines that Comment 4 322 (which is in response to Comment 3) is not insightful. In certain embodiments, comments that are not insightful may be grayed out or moved to the bottom of the thread of content.

In certain embodiments, the insightfulness engine 110 uses one or more heuristics for determining insightful comments. When highlighting insightful comments, the insightfulness engine 110 not only takes into account the comments from a single level or branch of a conversation tree, but also from multiple levels of the conversation tree. For instance, a given conversation may generally remain on topic and produce insightful comments related to that topic (i.e. a single thread). However, if that topic were to diverge slightly, still being related to the original thread in some way but now with a conversation thread of its own, the insightfulness engine 110 identifies such cases and indicates to the user the distinction between the branches of the conversation tree as they relate to insights.

Figure 4:
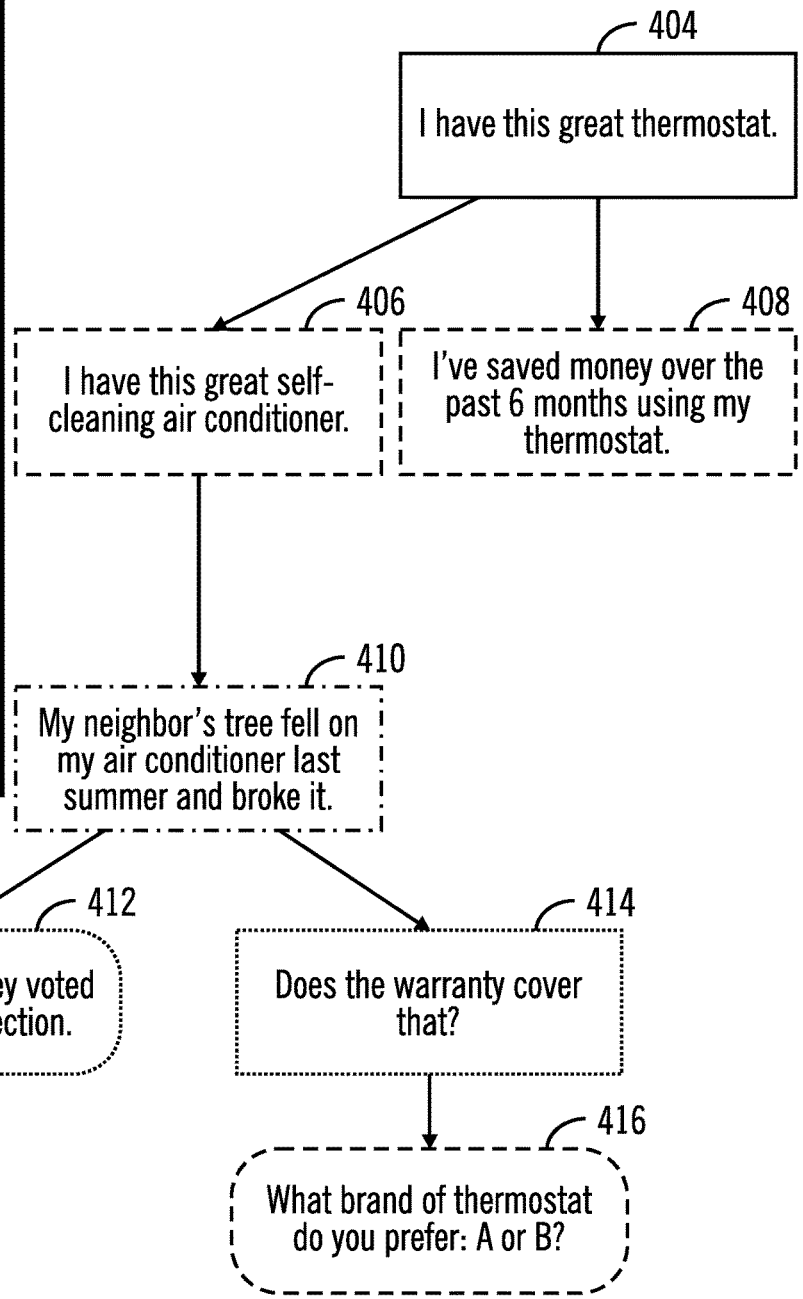
FIG. 4 illustrates, in a block diagram, a conversation tree of related insightful comments in accordance with certain embodiments.

FIG. 4 illustrates, in a block diagram, a conversation tree 400 of related insightful comments in accordance with certain embodiments. FIG. 4 illustrates a conversation tree 400 with a legend 402 for the blocks. The conversation tree 400 has a root 404, with branches and levels. A first block that is on a higher branch from a second block is an ancestor, while third block that is on a lower branch from the second block is a descendant.

In the conversation tree 400, block 404 is the information source and is illustrated with squared corners and a solid line. Blocks 404 and 406 illustrate insightful comments that are directly related to the context of the information source and are illustrated with squared corners and dashed lines. Block 410 illustrates an insightful comment that is indirectly related to the context of the information source and is illustrated with squared corners and a dashed/dotted line. Block 412 illustrates a comment that is off topic (i.e., not related to the context of the information source) and is illustrated with rounded corners and a dotted line. Block 414 illustrates a comment that is on topic (i.e., related to the context of the information source) but not insightful and is illustrated with squared corners and a dotted line. Block 416 illustrates a comment that is related to the context of the information source, but is scored lower because of poor n-1 and n-2 relatedness and is illustrated with rounded corners and a dashed line.

With reference to FIG. 4, three users, Mark, Jack, and Jane, are using an online technology forum. Mark starts talking about the latest digital thermostats. Many other comments appear in the thread about digital thermostats. Jack makes an insightful comment about how much money he's saved over the past 6 months using his thermostat. The conversation continues until Jack responds to Mark telling him about his self-cleaning air conditioner. While air conditioners are generally related to thermostats, this causes the conversation to take a slightly different turn and prompts several more comments about air conditioners. Finally, Jane chimes in that her neighbor's tree fell on her air conditioner last summer and broke it. This is a third branch in the conversation that sparks several comments about accidents and natural disasters. The insightfulness engine 110 distinctly highlights the insightful comments in each branch of the conversation tree, as well as, indicate the relatedness of those insights to other branches of the conversation.

In certain embodiments, the relationship distances between comments in the thread of content may be used to highlight insightful comments, both within a thread and among various branches of a conversation. A comment may be deemed insightful if it remains generally on topic but provides a unique angle to the conversation. This may also happen after a conversation branches. FIG. 4 illustrates such branching. In a branch of a conversation, there may be degrees of insightfulness to ancestors in the conversation tree. The insightfulness engine 110 may highlight those insightful comments in a way that keeps the user in the proper context of the conversation. Along these lines, the insightfulness engine 110 evaluates context aware similarity. Context aware similarity may be described as analyzing the current comment's inferred context (e.g., warranty coverage of air conditioners on 414) and how similar this context is to previous comments' contexts in the thread (e.g., thermostat reviews on 404 and/or air conditioner reviews on 406). That is, context aware similarity not only takes into account how related, or "on topic", a comment is according to the context of the discussion, but also takes into account how related that comment is to the prior n-1, n-2, etc. comments. This is especially useful in longer conversations that may have branched one or more times. For example, just because a comment is thread-related, if it's not related to the prior n-1 or n-2 comments, the insightfulness engine 110 ranks it as a less valuable comment. This is the case with block 416

While the comment of block 416 is related to the comment of block 404, it is not related to the prior two comments in that conversation branch. The insightfulness engine 110 either gives such a comment a lower score because of its position in the conversation or suggests that the user relocate the comment in the thread of content.

Figure 5A:
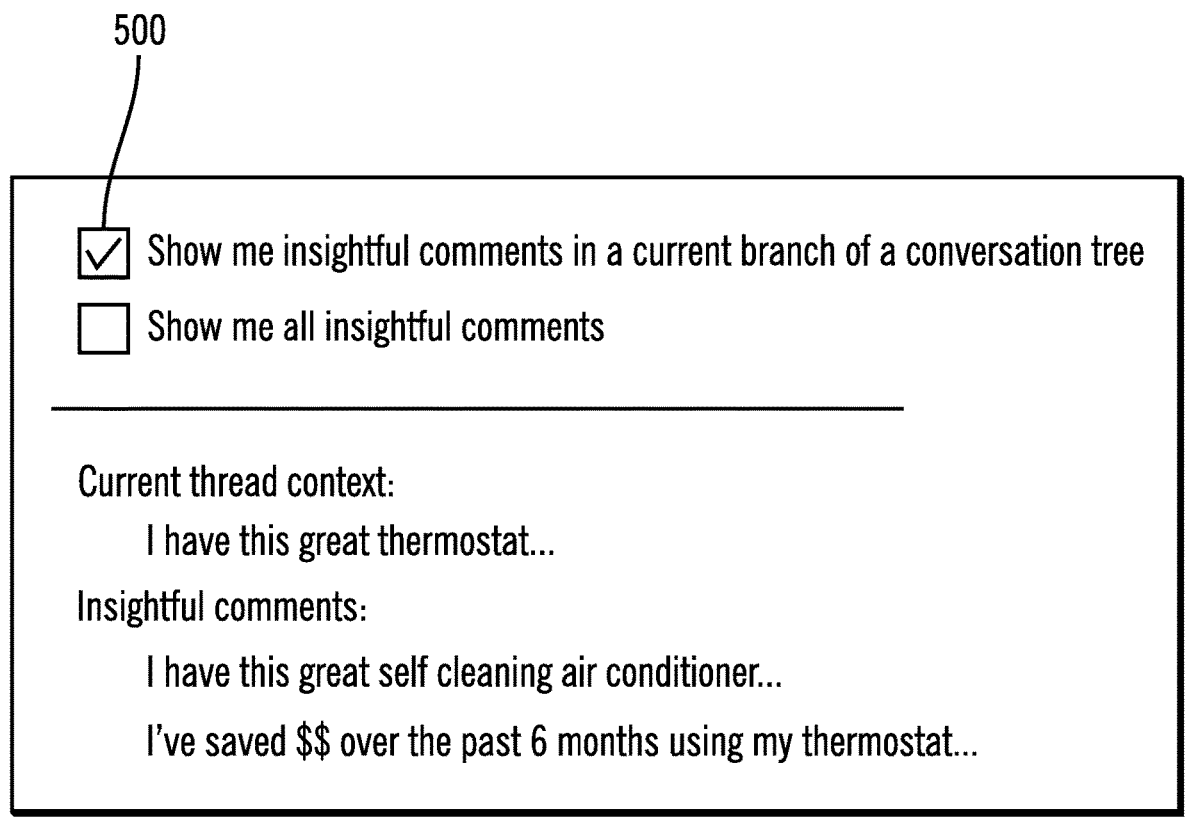

FIGS. 5A and 5B illustrate an alternative representation of related insightful comments in accordance with certain embodiments. In FIG. 5A in response to selection of the "Show me insightful comments in a current branch of a conversation tree" 500, the insightfulness engine 110 displays the current branch of the conversation tree and insightful comments. In FIG. 5B, in response to selection of the "Show me all insightful comments" 550, the insightfulness engine 110 displays the current thread context and all insightful comments.

Figure 6:
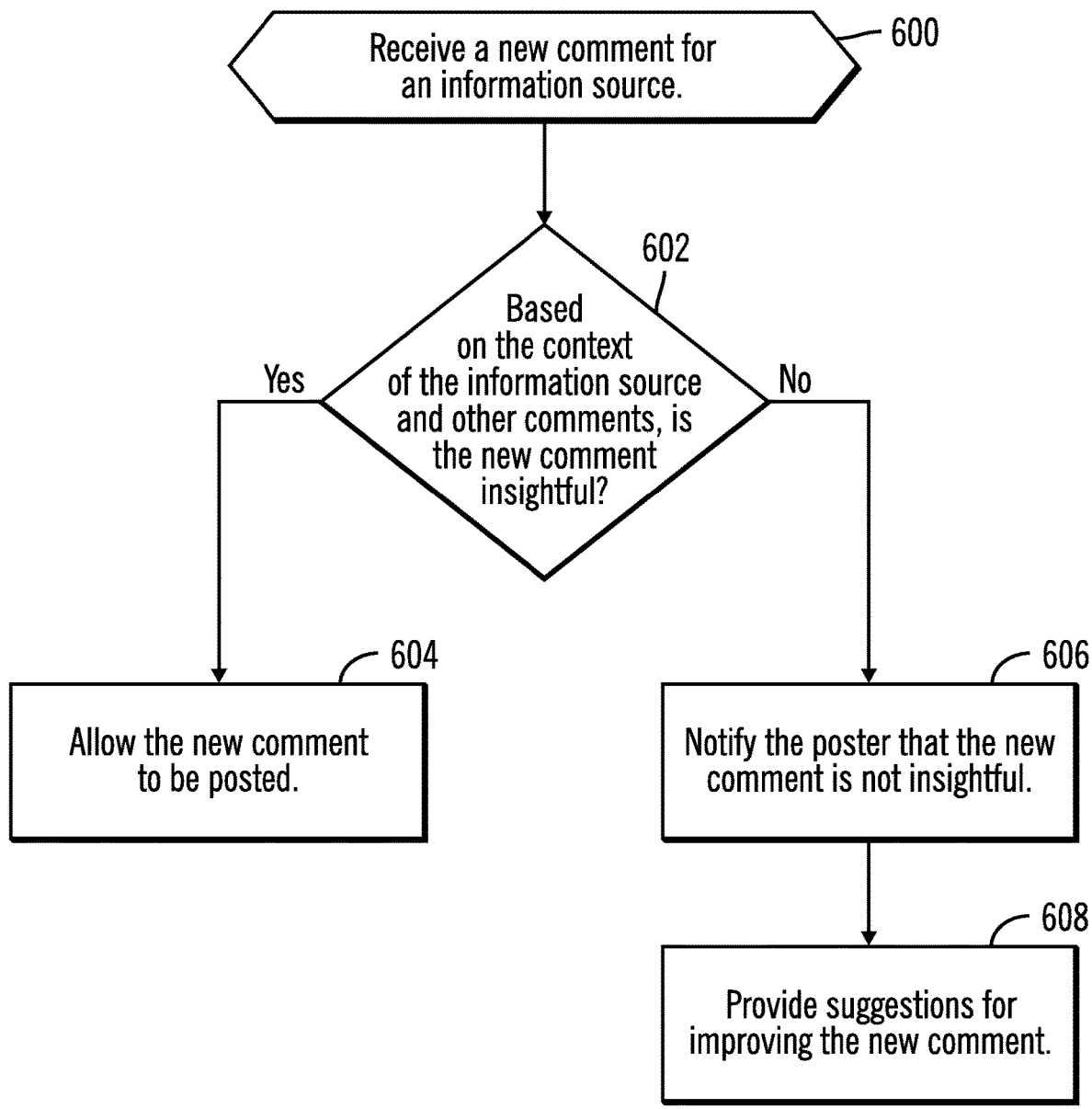
FIG. 6 illustrates, in a flow chart, operations for processing a new comment in accordance with certain embodiments.

FIG. 6 illustrates, in a flow chart, operations for processing a new comment in accordance with certain embodiments. Control begins at block 600 with the insightfulness engine 110 receiving a new comment for an information source. In block 602, the insightfulness engine 110, based on the context of the information source and other comments, determines whether the new comment is insightful. If the new comment is insightful, processing continues to block 604, otherwise, processing continues to block 606. In block 604, the insightfulness engine 110 allows the new comment to be posted. In block 606, the insightfulness engine 110 notifies the poster that the new comment is not insightful (e.g., may be redundant, may be off-topic, etc.). In block 608, the insightfulness engine 110 provides suggestions for improving the new comment.

Merely to enhance understanding of embodiments, the following example is provided. In this example, a person refused to pay taxes due to personal beliefs and held a press conference. A video of the press conference was made available on the internet. The comments section of the video contains over 1000 comments. There are many similar comments criticizing the person for not paying taxes and there are many similar comments praising the person for not paying taxes. The insightfulness engine 110 identifies insightful comments, such as, "one should not fail to pay taxes based on personal beliefs", out of all the comments. The insightfulness engine 110 may also determine from the context of the video, that the speaker in the video is a female of a particular organized group. Then, the insightfulness engine 110 uses a known relationship between the concepts of the organized group and government regulations using an ontology. In analyzing the comment, the insightfulness engine deduces that the relationship between comments mentioning the organized group may provide a deeper insight. With over 1000 comments, such insightful comments may be difficult to find or may be at the end of all of the comments. The insightfulness engine 110 highlights such comments for easier viewing and may move such insightful comments above redundant comments. Also, if another user attempts to post a similar comment to other comments, the insightfulness engine 110 determines that the comment is not insightful and notifies the user that the comment is redundant and may also provide suggestions for improving the comment, such as indicating that further details should be provided for clarification or to distinguish from other comments already posted.

The insightfulness engine 110 uses natural language processing to understand a thread of a content for the purpose of highlighting insightful comments. Insightful comments may be described as comments not directly related to the original idea of a thread of content, but ones that add depth or a new perspective to the thread of content. A thread of content may also be referred to as a thread of conversation. In certain embodiments, a thread of content may be described as a type of conversation that may take various forms, such as a feed, comments on a web page, posts, forum posts, etc. In order to not miss key insights, the insightfulness engine 110 also normalizes user generated content for alleviating reader bias. The insightfulness engine 110 allows participants in a conversation to engage with each other more intelligently and efficiently.

In certain embodiments, the insightfulness engine 110 determines a context for a thread of comments by analyzing each of the comments in the thread of comments to determine which comments are insightful based on semantic analysis of semantic relationships and highlights the comments determined to be more insightful. Also, with embodiments, the insightfulness engine 110 uses the semantic relationships to provide supporting evidence and cross references to additional information. In certain embodiments, the insightfulness engine 110 determines that a comment is insightful by inspecting a length of the comment and semantic relationships of the comment to determine that the comment represents one of a deeper insight and a different perspective. Also, in certain embodiments, the insightfulness engine 110 determines that a comment is insightful by determining that the semantic relationships are on topic and sufficiently dissimilar from other comments. Moreover, in certain embodiments, the insightfulness engine 110 determines that a comment is insightful by analyzing different topics of the comments separately and analyzing the comments together. In addition, in certain embodiments, the thread of comments comprises one of a feed, comments on a web page, social media comments, and forum comments.

In certain embodiments, the insightfulness engine 110 receives a new comment, determines that the new comment is similar to at least one of the comments in the thread of comments and providing a suggestion to improve the new comment based on relationships of the new comment to the comments in the thread of comments.

Figure 7:
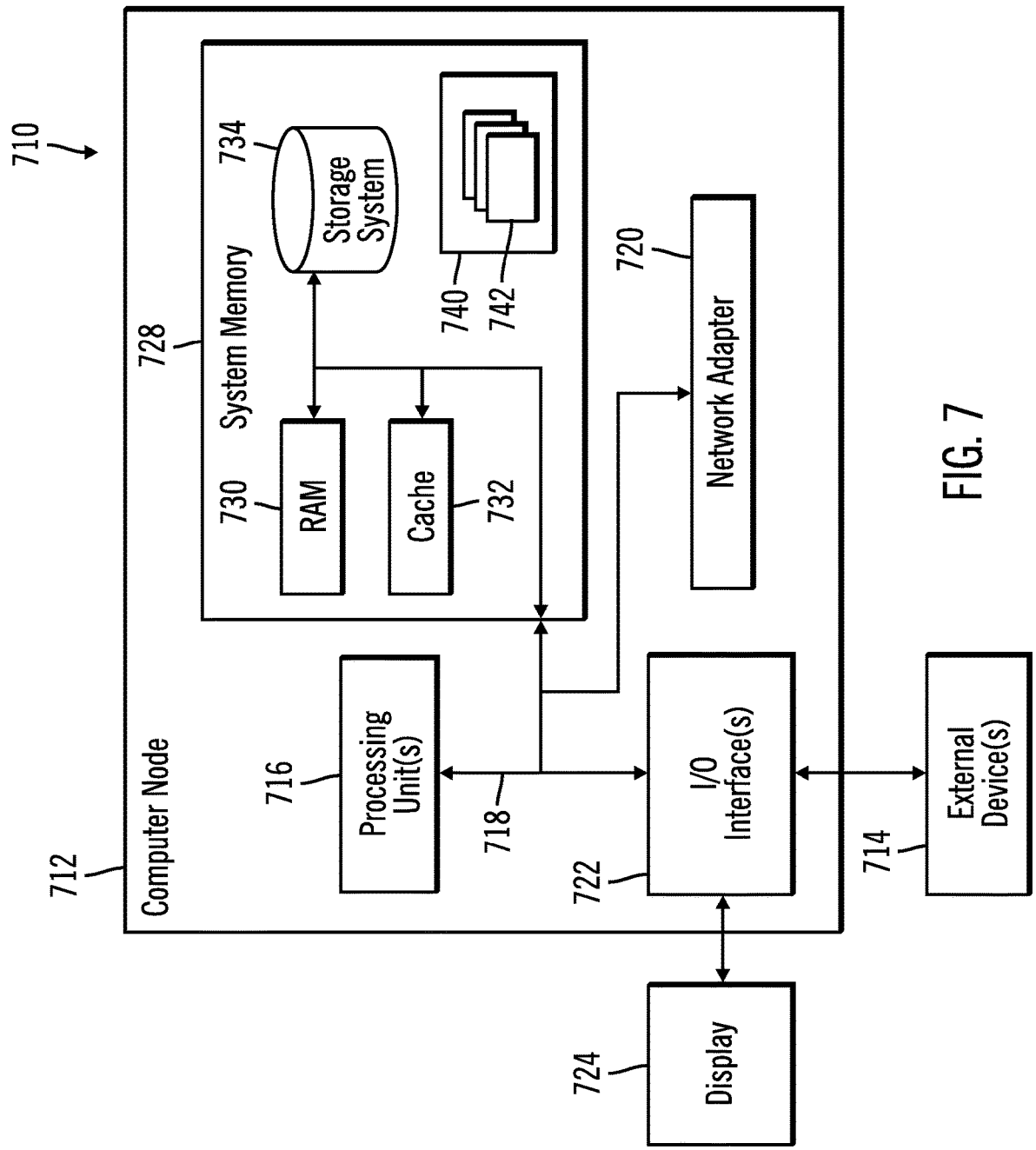
FIG. 7 illustrates a computing node in accordance with certain embodiments.

FIG. 7 illustrates a computing environment 710 in accordance with certain embodiments. In certain embodiments, the computing environment is a cloud computing environment. Referring to FIG. 7, computer node 712 is only one example of a suitable computing node and is not intended to suggest any limitation as to the scope of use or functionality of embodiments of the invention described herein. Regardless, computer node 712 is capable of being implemented and/or performing any of the functionality set forth hereinabove.

The computer node 712 may be a computer system, which is operational with numerous other general purpose or special purpose computing system environments or configurations. Examples of well-known computing systems, environments, and/or configurations that may be suitable for use with computer node 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 712 may be described in the general context of computer system executable instructions, such as program modules, being executed by a computer system. Generally, program modules may include routines, programs, objects, components, logic, data structures, and so on that perform particular tasks or implement particular abstract data types. Computer node 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer node 712 is shown in the form of a general-purpose computing device. The components of computer node 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 712 typically includes a variety of computer system readable media. Such media may be any available media that is accessible by computer node 712, and it includes both volatile and non-volatile media, removable and non-removable media.

System memory 728 can include computer system readable media in the form of volatile memory, such as random access memory (RAM) 730 and/or cache memory 732.

Computer node 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer node 712 may also communicate with one or more external devices 714 such as a keyboard, a pointing device, a display 724, etc.; one or more devices that enable a user to interact with computer node 712; and/or any devices (e.g., network card, modem, etc.) that enable computer node 712 to communicate with one or more other computing devices. Such communication can occur via Input/Output (I/O) interfaces 722. Still yet, computer node 712 can communicate with one or more networks such as a local area network (LAN), a general wide area network (WAN), and/or a public network (e.g., the Internet) via network adapter 720. As depicted, network adapter 720 communicates with the other components of computer node 712 via bus 718. It should be understood that although not shown, other hardware and/or software components could be used in conjunction with computer node 712. Examples, include, but are not limited to: microcode, device drivers, redundant processing units, external disk drive arrays, RAID systems, tape drives, and data archival storage systems, etc.

In certain embodiments, the computing device 100 has the architecture of computer node 712. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
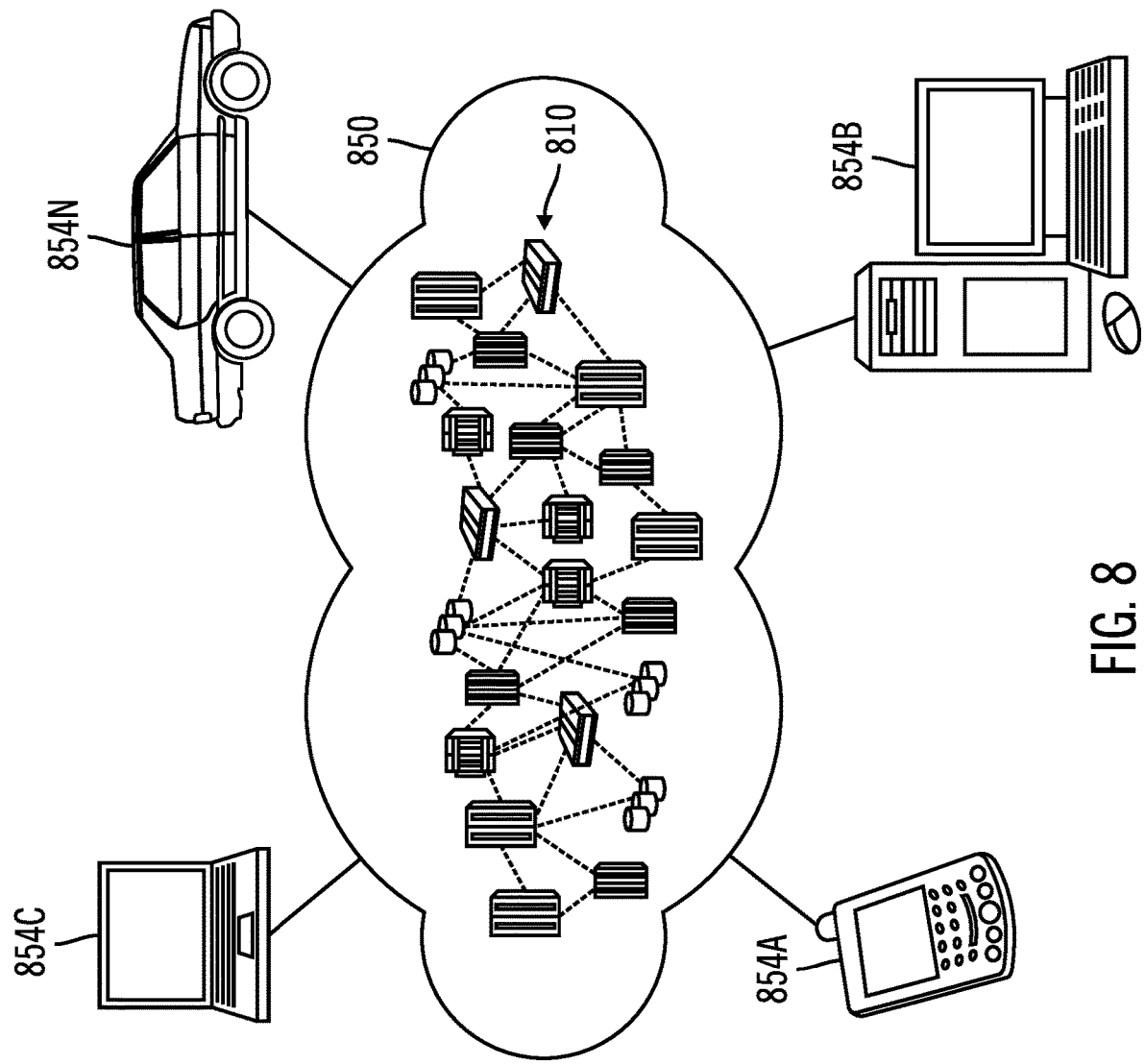
FIG. 8 illustrates a cloud computing environment in accordance with certain embodiments.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
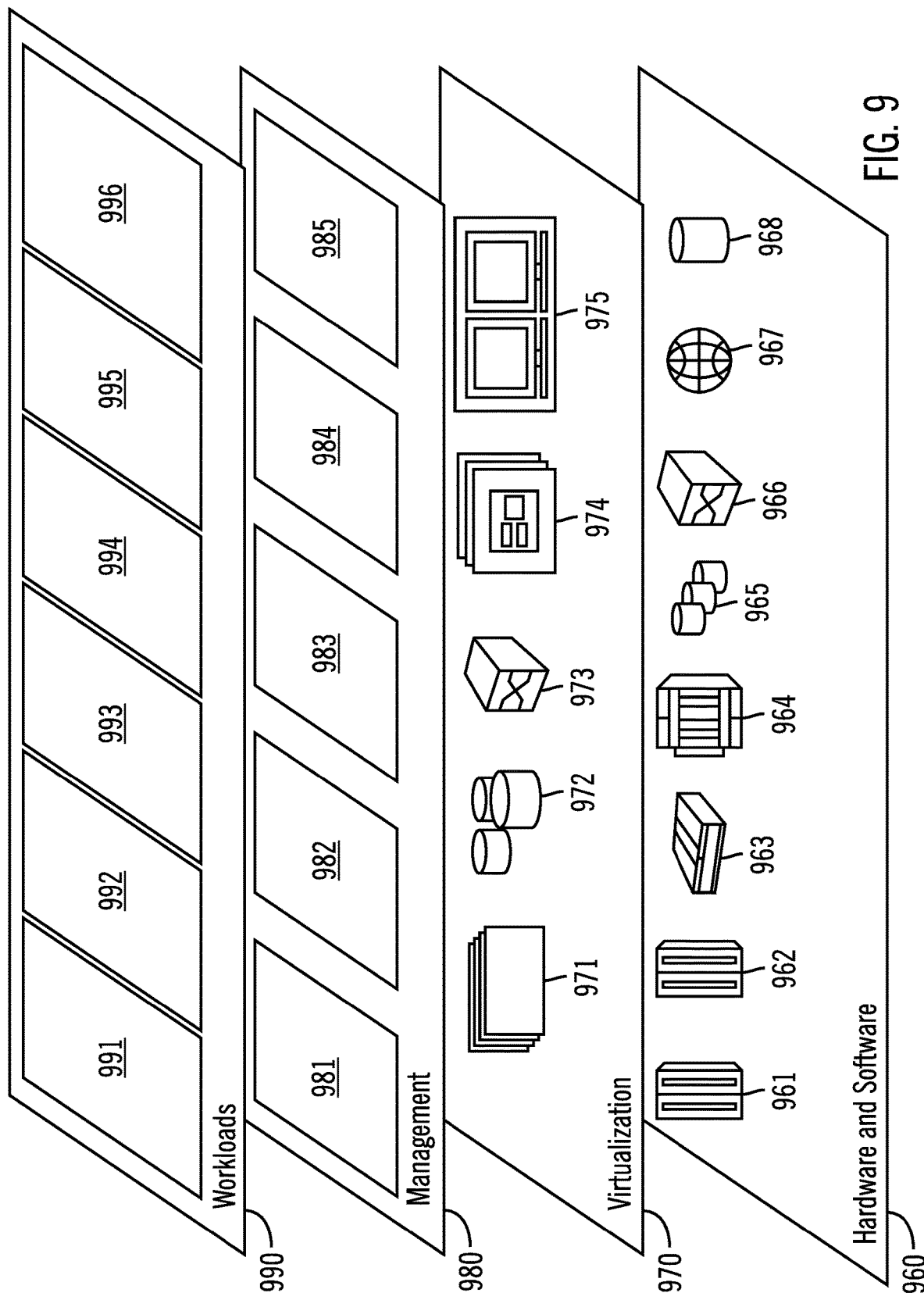
FIG. 9 illustrates abstraction model layers in accordance with certain embodiments.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and detecting and highlighting insightful comments in a thread of content 996.

Thus, in certain embodiments, software or a program, implementing detecting and highlighting insightful comments in a thread of content in accordance with embodiments described herein, is provided as a service in a cloud environment.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The foregoing description provides examples of embodiments of the invention, and variations and substitutions may be made in other embodiments.

What is claimed is:

1. A computer-implemented method, comprising operations for:
   determining a topic for a thread of content including comments;
   analyzing each of the comments in the thread of content to determine which of the comments are insightful and which of the comments are not insightful, wherein the comments that are insightful are related to the topic, and wherein the comments that are not insightful are not related to the topic;
   highlighting the comments that are insightful;
   hiding the comments that are not insightful;
   using semantic relationships to provide supporting evidence and cross references to additional information for the comments that are related to context;
   in response to determining that a particular comment that is insightful presents reader bias, altering the highlighting; and
   replacing the particular comment with a summary of the particular comment and with a link to the particular comment;
   in response to receiving a new comment, determining whether the new comment is redundant to a previously submitted comment that is insightful; and
   in response to determining that the new comment is redundant, providing a notification that the new comment is redundant; and
   providing a suggestion to improve the new comment; and
   displaying a conversation tree having multiple levels showing connections between the comments that are insightful.

2. The computer-implemented method of claim 1, wherein determining that a comment of the comments is insightful, further comprises operations for:
   inspecting a length of the comment and semantic relationships of the comment to determine that the comment represents one of a deeper insight and a different perspective.

3. The computer-implemented method of claim 1, wherein determining that a comment of the comments is insightful, further comprises operations for:
   analyzing different topics of the comments separately; and
   analyzing the comments together.

4. The computer-implemented method of claim 1, wherein the thread of content comprises one of a feed, comments on a web page, social media comments, and forum comments.

5. The computer-implemented method of claim 1, further comprising operations for:
receiving another new comment;
determining that the another new comment is similar to at least one of the comments in the thread of content; and
providing a new suggestion to improve the another new comment based on relationships of the another new comment to the comments in the thread of content.

6. The computer-implemented method of claim 1, wherein a Software as a Service (SaaS) is configured to perform the operations of the method.

7. A computer program product, the computer program product comprising a computer readable storage medium having program code embodied therewith, the program code executable by at least one processor to perform operations for:
determining a topic for a thread of content including comments;
analyzing each of the comments in the thread of content to determine which of the comments are insightful and which of the comments are not insightful, wherein the comments that are insightful are related to the topic, and wherein the comments that are not insightful are not related to the topic;
highlighting the comments that are insightful;
hiding the comments that are not insightful;
using semantic relationships to provide supporting evidence and cross references to additional information for the comments that are related to context;
in response to determining that a particular comment that is insightful presents reader bias, altering the highlighting; and
replacing the particular comment with a summary of the particular comment and with a link to the particular comment; and
in response to receiving a new comment, determining whether the new comment is redundant to a previously submitted comment that is insightful; and
in response to determining that the new comment is redundant, providing a notification that the new comment is redundant; and
providing a suggestion to improve the new comment; and
displaying a conversation tree having multiple levels showing connections between the comments that are insightful.

8. The computer program product of claim 7, wherein, for determining that a comment of the comments is insightful, the program code is executable by the at least one processor to perform operations for:
inspecting a length of the comment and semantic relationships of the comment to determine that the comment represents one of a deeper insight and a different perspective.

9. The computer program product of claim 7, wherein, for determining that a comment of the comments is insightful, the program code is executable by the at least one processor to perform operations for:
analyzing different topics of the comments separately; and
analyzing the comments together.

10. The computer program product of claim 7, wherein the thread of content comprises one of a feed, comments on a web page, social media comments, and forum comments.

11. The computer program product of claim 7, wherein the program code is executable by the at least one processor to perform:
receiving another new comment;
determining that the another new comment is similar to at least one of the comments in the thread of content; and
providing a new suggestion to improve the another new comment based on relationships of the another new comment to the comments in the thread of content.

12. The computer program product of claim 7, wherein a Software as a Service (SaaS) is configured to perform the operations of the computer program product.

13. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
determining a topic for a thread of content including comments;
analyzing each of the comments in the thread of content to determine which of the comments are insightful and which of the comments are not insightful, wherein the comments that are insightful are related to the topic, and wherein the comments that are not insightful are not related to the topic;
highlighting the comments that are insightful;
hiding the comments that are not insightful;
using semantic relationships to provide supporting evidence and cross references to additional information for the comments that are related to context;
in response to determining that a particular comment that is insightful presents reader bias, altering the highlighting; and
replacing the particular comment with a summary of the particular comment and with a link to the particular comment; and
in response to receiving a new comment, determining whether the new comment is redundant to a previously submitted comment that is insightful; and
in response to determining that the new comment is redundant, providing a notification that the new comment is redundant; and
providing a suggestion to improve the new comment; and
displaying a conversation tree having multiple levels showing connections between the comments that are insightful.

14. The computer system of claim 13, wherein the operations for determining that a comment of the comments is insightful, further comprise:
inspecting a length of the comment and semantic relationships of the comment to determine that the comment represents one of a deeper insight and a different perspective.

15. The computer system of claim 13, wherein the operations for determining that a comment of the comments is insightful, further comprise:
analyzing different topics of the comments separately; and
analyzing the comments together.

16. The computer system of claim 13, wherein the thread of content comprises one of a feed, comments on a web page, social media comments, and forum comments.

17. The computer system of claim 13, wherein a Software as a Service (SaaS) is configured to perform the operations of the computer system.

18. The computer system of claim 13, wherein the operations for determining that a comment of the comments is insightful, further comprise:
- receiving another new comment;
- determining that the another new comment is similar to at least one of the comments in the thread of content; and
- providing a new suggestion to improve the another new comment based on relationships of the another new comment to the comments in the thread of content.

* * * * *